United States Patent
Schrock et al.

[11] Patent Number: 6,128,446
[45] Date of Patent: Oct. 3, 2000

[54] METHOD AND APPARATUS FOR ANNOTATION OF PHOTOGRAPHIC FILM IN A CAMERA

[75] Inventors: Anthony W. Schrock, Rochester; Dale F. Mcintyre, Honeoye Falls, both of N.Y.

[73] Assignee: Eastman Kodak Company, Rochester, N.Y.

[21] Appl. No.: 08/989,018

[22] Filed: Dec. 11, 1997

[51] Int. Cl.[7] .................................................. G03B 17/24
[52] U.S. Cl. ...................... 396/297; 396/299; 396/310; 396/287
[58] Field of Search .................................. 396/310, 312, 396/313, 319, 297, 299, 300, 281, 287, 292, 295

[56] References Cited

U.S. PATENT DOCUMENTS

| | | | |
|---|---|---|---|
| 4,389,109 | 6/1983 | Taniguchi et al. | 396/56 |
| 4,742,369 | 5/1988 | Ishii et al. | 396/213 |
| 5,229,810 | 7/1993 | Cloutier et al. | 396/319 X |
| 5,564,005 | 10/1996 | Weber et al. | 395/161 |
| 5,666,186 | 9/1997 | Meyerhoefer et al. | 396/310 X |
| 5,689,742 | 11/1997 | Chamberlain, IV | 396/313 |
| 5,737,491 | 4/1998 | Allen et al. | 396/283 X |
| 5,751,505 | 5/1998 | Yoshida | 396/319 X |

*Primary Examiner*—Safet Metjahic
*Assistant Examiner*—J. K. Han
*Attorney, Agent, or Firm*—Francis H. Boos, Jr.

[57] ABSTRACT

Camera apparatus and method with provision for selection of image annotations to be recorded with captured images. Camera user initiated keywords associated with groupings of annotations are inputted to the camera via voice recognition or handwriting recognition to search for related annotations using group codes which may also include hierarchical rank classification codes. Annotations pre-recorded in memory and having codes matching those of the inputted keywords are displayed on a camera display device to allow the camera user to rapidly select a desired annotation for recording of the associated code in connection with the captured image. The code is then utilized in known manner during photofinishing to print the selected annotation on the front or back of the reproduced image print.

10 Claims, 6 Drawing Sheets

METHOD AND APPARATUS FOR ANNOTATION OF PHOTOGRAPHIC FILM IN A CAMERA

FIELD OF THE INVENTION

The invention relates to the field of photographic cameras, and in particular to methods and apparatus for providing random access to a library of image annotations when selecting a specific annotation to accompany an image captured in a picture taking event.

BACKGROUND OF THE INVENTION

Photographic images are used to capture and display information about memorable occasions, but often the image alone does not contain all the desired information. Image annotation is the process of adding additional information to the image for such uses as enhanced image enjoyment, reminders of the people or places in the image, industry applications, education, classification, and other information about the captured image. It is well known to make provision in a camera for optical annotation of date and time on a negative film image that appears in the resultant print image. It is also known to provide for recording of an annotation code on a magnetic data track on the film which is read by a photofinishing lab and used to look up the corresponding annotation from a annotation library that is then printed on the front or back of the affected print. While the photographer can add annotation at any time through a variety of methods, it is most desirable to provide for annotation at the time of picture taking. When done during picture taking, it is desirable that the function of selecting and recording a desired annotation allow for selection from a wide range of possible annotation data, be easy to use and inject a minimum of interference with the picture taking process.

When recording annotation data on the film during picture taking, there is an issue as to the amount of storage space that is available on the film for this purpose. In the Advanced Photo System (APS), the film is coated with a magnetic layer to allow magnetic data recording on the film. Since there is a limited amount of data storage space available, the APS system provides for a system of designated "select annotation" codes, which is a limited listing of predefined annotations from which the photographer can select. Only the code is stored on the magnetic layer of the film. At the photofinisher, the codes are read from the film and are looked up in a predefined table. An annotation corresponding to the code is then printed on the back or front of the image. Some of the drawbacks of this annotation system are lack of customization, and a limited ability to access more than a few annotations. Some of the current APS cameras that incorporate this feature require the user to program the annotation codes from a list, much like setting the day/date clock. This allows a small number of annotations (three, for example) to be accessed quickly, but if other annotations from the list are desired, they must be painstakingly programmed into the camera. The alternative is to provide large and costly memory capacity in the camera to hold all of the annotations for display to the photographer.

It is an object of the invention therefore to provide for convenient annotation of a captured image during picture taking with the ability to choose a desired annotation rapidly from a wide selection of available predefined annotations.

SUMMARY OF THE INVENTION

In accordance with the invention, therefore, there is provided camera apparatus having provision for image annotation selection, the camera apparatus comprising a data display device and data input means for inputting user-initiated keywords associated with potential annotations to be associated with an image captured on film in the camera. The camera apparatus also includes a first memory having stored therein a list of the potential annotations suitable for annotation of an image captured on film in the camera, each stored potential annotation having an annotation identification code and one or more group codes stored therewith wherein each group code is associated with a plurality of annotations having a common theme. The camera apparatus further includes a second memory having stored therein a list of keywords, each keyword having one or more of said group codes stored therewith which associate said keyword to related annotation groupings; and includes a temporary data storage memory. The camera apparatus further includes a microcontroller responsive to user-initiated keywords from the data input means for generating and storing in the temporary data storage memory a sublist of annotation identification codes resulting from comparison of annotation group codes in the first memory with matching group codes of keywords in the second memory which correspond to the user-initiated keywords and for causing display on the data display device of the annotations corresponding to the sublist of annotation identification codes to allow selection of a desired annotation by the user. The camera apparatus still further includes data recording means for recording on photographic film in the camera the unique ID code corresponding to an annotation selected by said user from said displayed annotations.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
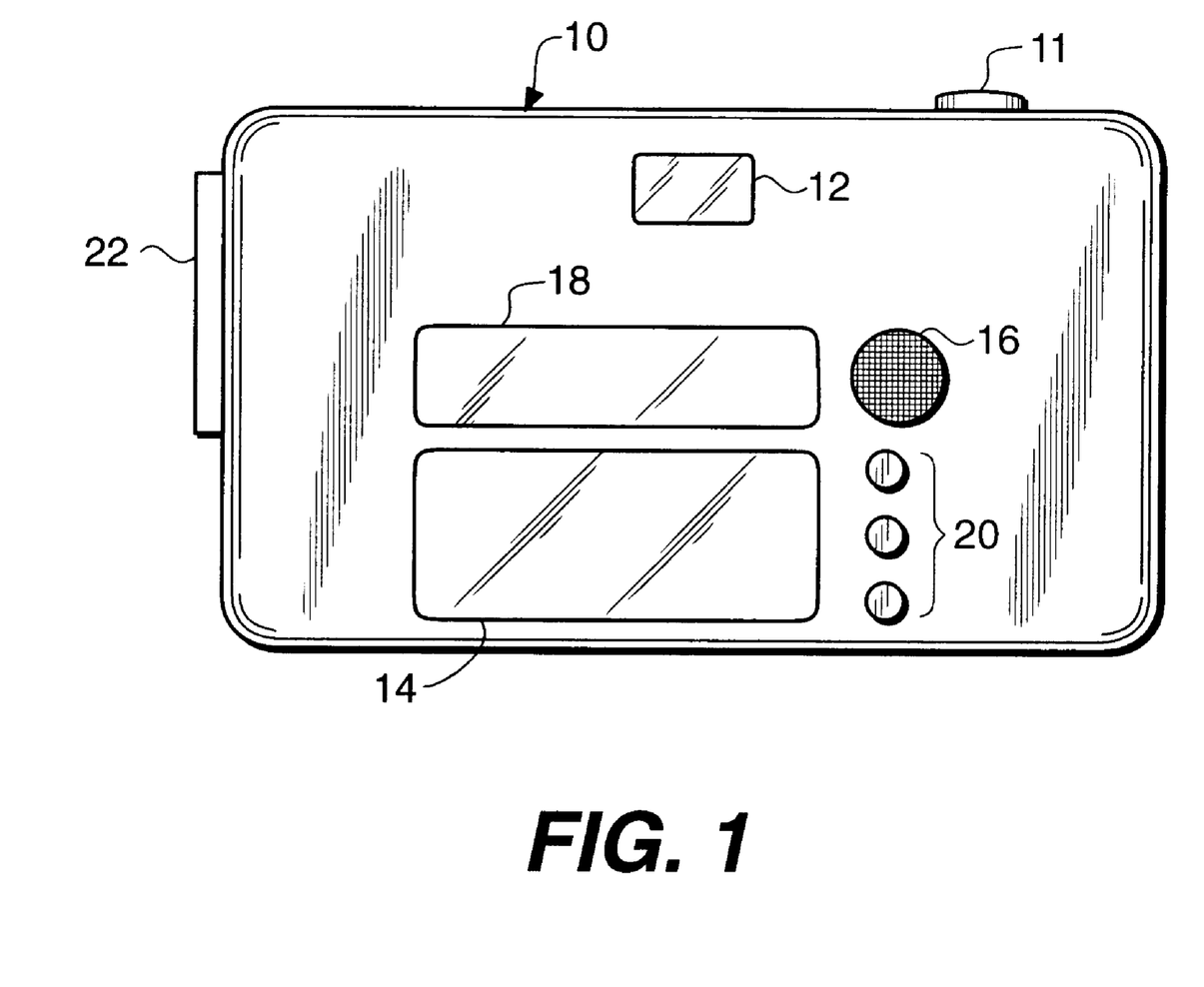
FIG. 1 is a rear elevation view of a photographic camera having provision for selecting and displaying annotation data to be recorded on film in the camera in accordance with the invention.
Figure 2:
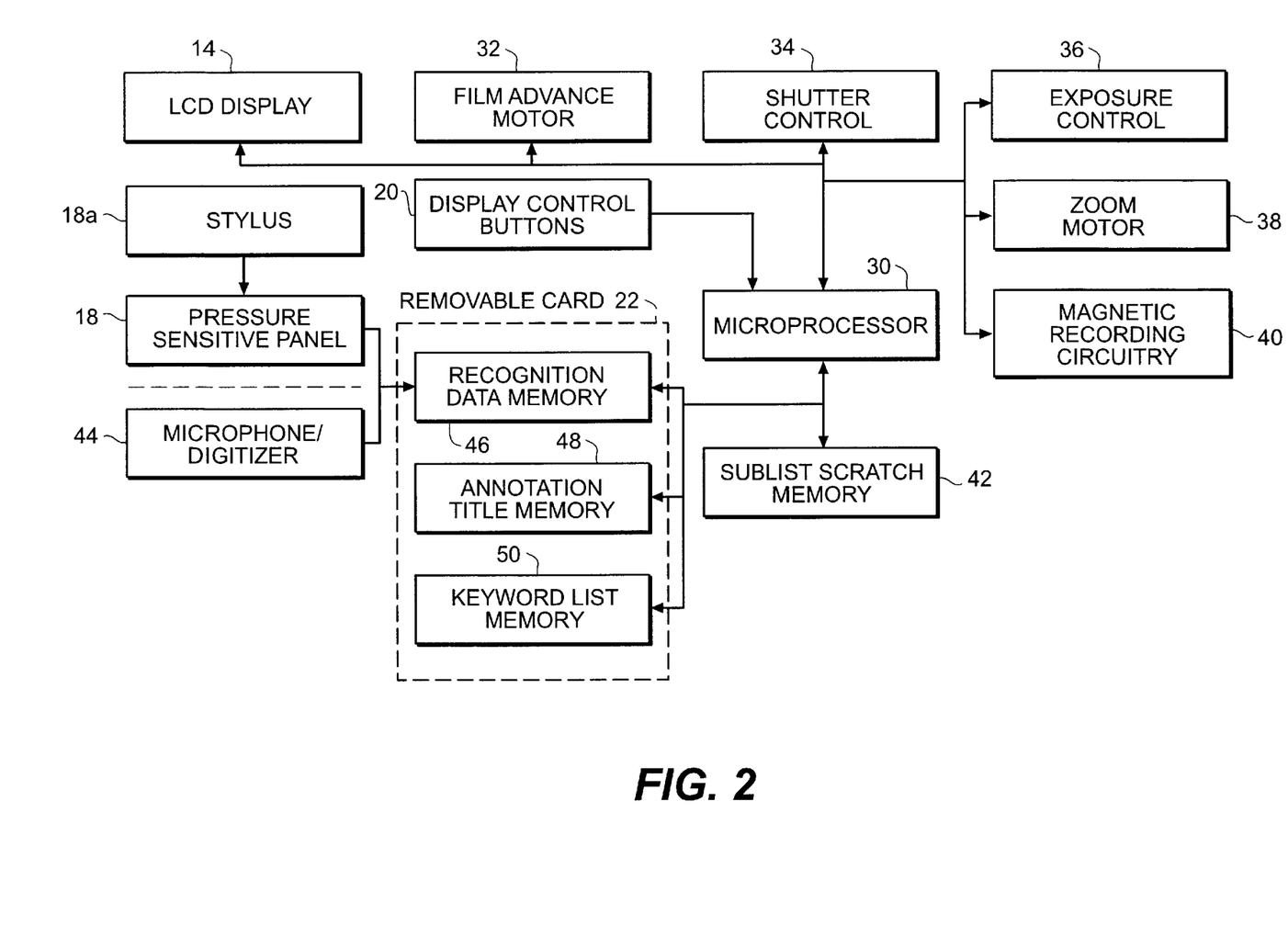
FIG. 2 is a functional block diagram showing the essential functional components of the camera of FIG. 1.

Referring jointly to FIGS. 1 and 2, a camera 10 is illustrated comprising camera apparatus with provision for selection of image annotations includes keyword data input means for inputting user-initiated keywords contained in potential annotations to be coupled with an image captured on film in the camera. In the illustrated embodiment, the keyword data input means of the invention may include one or more of the following described examples of data input structure. As such, the data input means may include a microphone 16 coupled internally to a digitizer 44 which converts analog signals from the microphone to digital information signals. The data input means may also include a pressure sensitive panel which cooperates with a user operated stylus 18a to allow keywords to be handwritten and entered manually. The data input means may also include selection buttons or softkeys 20 to allow the camera user to scroll through keywords, certain keycodes and annotations displayed on an LCD display panel 14 to select desired data inputs. A removable memory card 22 is shown inserted into a memory card receiving slot on the side of the camera 10. As will be seen, this removable memory card provides for considerable expansion of the available annotations. The camera 10 also includes other elements such as shutter release button 11, viewfinder 12, and a microprocessor 30 for controlling various function elements in the camera, notably a film advance motor 32, shutter control 34, exposure control 36 and taking lens zoom motor 38. Microprocessor 30 is also programmed to perform the annotation search and selection procedure described herein and is coupled to magnetic recording unit 40 to control magnetic recording of data, including annotation data, on a magnetic layer formed on photographic film in the camera in accordance with known magnetic recording principles of operation of the commercially available Advanced Photo System.

According to a feature of the invention, removable memory card 22 is provided with a recognition data memory segment 46, an annotation title memory segment 48 and a keyword list memory segment 50. The recognition data memory segment 46 is used in conjunction with touch screen 18 and/or microphone/digitizer 44 to aid in recognition of handwritten or spoken letters or words for convenient, fast input by the camera user of keywords to be used in selection of a desired annotation. Several commercial systems for speech recognition are available, including the RSC164 integrated circuit from Sensory Systems, Inc. These systems may be programmed to recognize words and phrases either in a speaker dependent or speaker independent mode. Several handwriting recognition systems are also available, such as SmARTwriter from Advanced Recognition Technologies, Inc. Additional input may be by pushbutton selection, utilizing one or more of softkeys 20 arranged along one side of display 14. The functions of these keys are redefined depending on the current state of operation of the camera. The camera also includes a sublist scratch memory 42 to serve as a temporary data storage memory for use during the annotation selection procedure.

Annotation title memory segment 48 comprises a first memory which has stored therein a list of annotations suitable for annotation of the captured image. As will be seen in more detail subsequently, each stored annotation has stored therewith an annotation identification code that uniquely identifies a specific annotation and one or more group codes, wherein each group code is associated with a plurality of annotations having a common theme. Keyword list memory segment 50 comprises a second memory which has stored therein a list of keywords, each of which has one or more of the group codes stored therewith to associate each of the keywords with related annotation groups.

Camera 10 further includes a microcontroller 30 which is responsive to user-initiated keywords input by the user via one of the above described input means to generate one or more sublists of annotation identification codes. These code sublists, which are stored in scratch memory 42, result from matches between annotation group codes from the annotation title memory 48 and the corresponding group codes of those keywords stored from the keyword list memory 50 which correspond to the user-initiated keywords inputted by the voice or character recognition. The microcontroller 30 is operative to cause display on the data display 14 of those annotations or memory 48 which correspond to the sublist of annotation codes in scratch memory 42 thereby allowing the camera user to select the particular desired annotations using the scrolling and selection function of softkeys 20. Once selected, the microcontroller then actuates the magnetic recording unit 40 to record the identification code for the user-selected annotation onto the photographic film in the camera.

Figure 3:
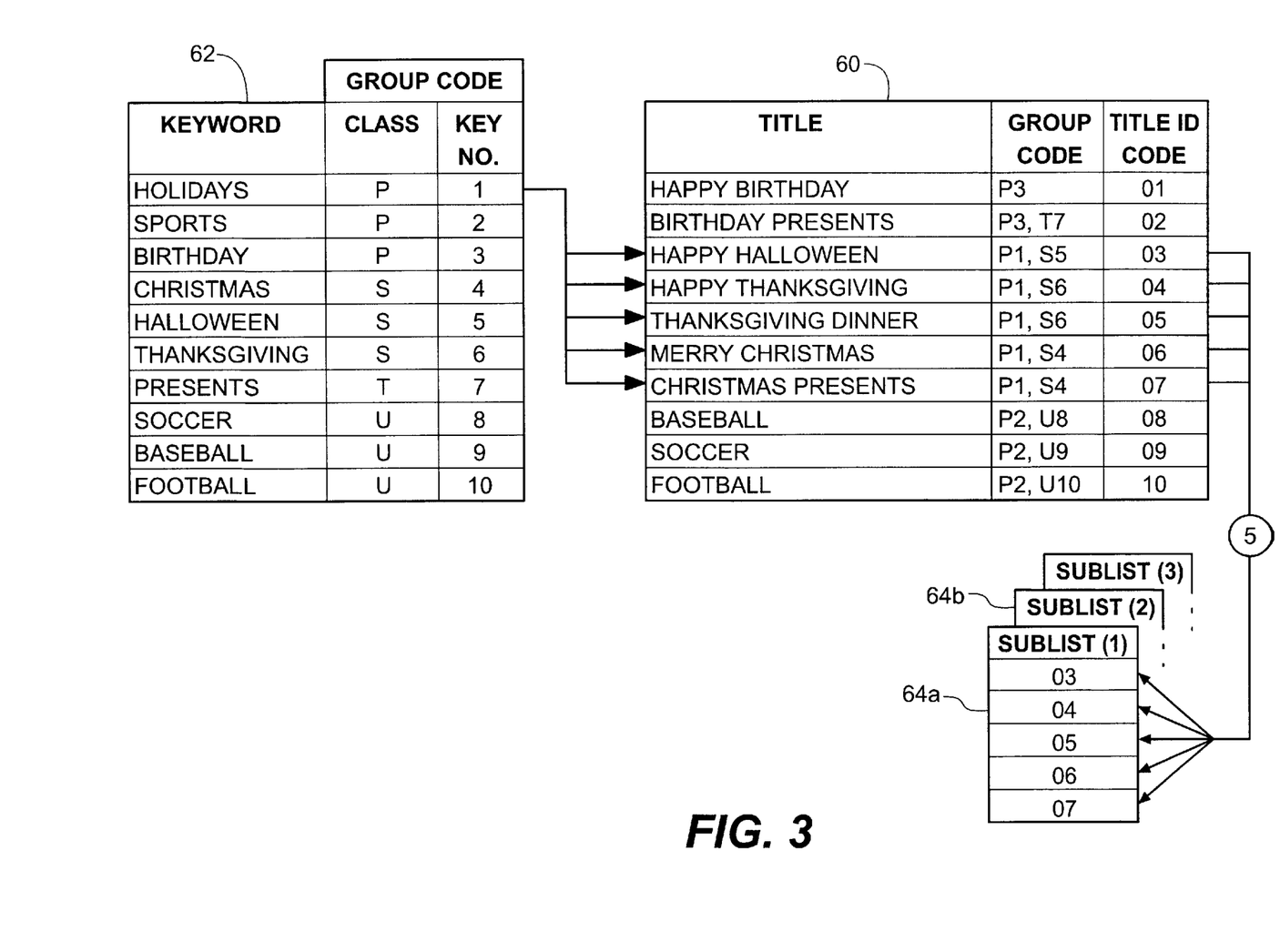
FIG. 3 is a memory map useful in explaining the operation of annotation selection according to the invention.
Figure 6:
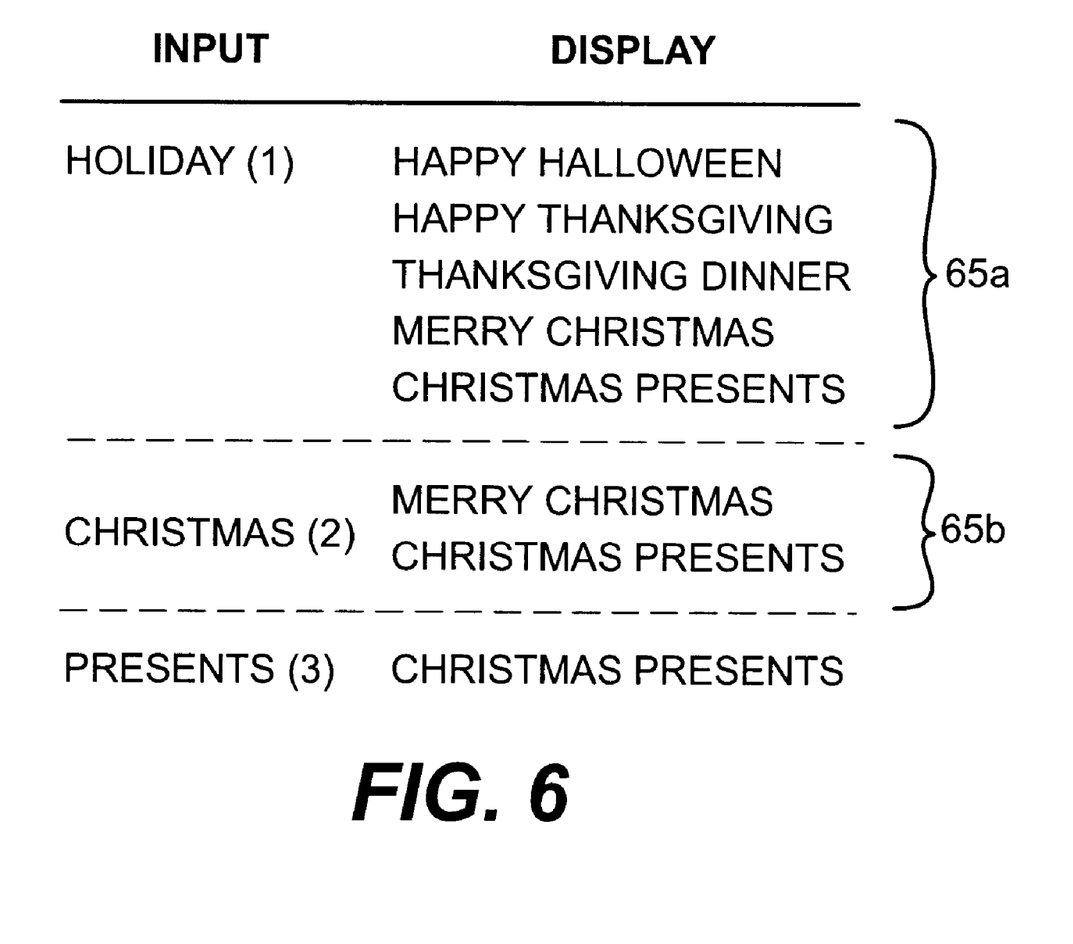
FIG. 6 is a chart illustrating an example of an annotation selection sequence in accordance with an aspect of the invention.

The manner in which camera 10 operates in accordance with the invention will be described with reference jointly to FIGS. 3–6. Referring specifically to the search routine flowchart of FIG. 5, the user enters annotation mode in step S1. At S2, the user enters a keyword via speech recognition or handwriting recognition as described above. At S3, the keyword list is searched and checked for a match to the input keyword. If no match is found, the flow returns to the input point S2. If a match is found, the corresponding key code is retrieved from the keyword memory 50 and the key code component of the title structure in title memory 48 is searched in step S4. If no match is found in the title, the search routine then checks at S8 to see if the end of the list in memory 48 has been reached. If not, the search routine indexes to the next title and searches the next set of key codes. If a key code match has been found, the title index is added at S6 to a new code sublist 64a in scratch memory 42 and control returns to the end of list check at S8. If the end of the list has occurred, the titles as indexed by the sublist 64a of title codes in scratch memory 42 is displayed at S9. If no error has occurred in the process (S10), the user at S11 can then use the appropriate one of softkeys 20 to choose a title from the list and the corresponding code is written to the film by recording circuit at S12. Alternatively, the user can add a new keyword, returning to S2. The resulting key code is searched through the title list as indexed by the sublist, with a new sublist 64b being created in scratch memory 42. The process continues until the user selects from a list of titles or a single title sublist is generated. An example is shown in FIG. 3. If the user enters the wrong keyword, he can "back up" search levels in steps S13–S15. Table 60 shows the title list and the group code and title ID structure associated with it. Table 62 shows the keyword list with its associated group code structure. The user selects the keyword "holiday" name from keyword list 62 and the resulting code sublist 64a of titles is displayed (list 65a FIG. 6). The user may then scroll and select from the displayed title list 65a or enter an additional keyword such as "Christmas". In this case, the list of titles returned from the first search is further searched for those that contain both keywords, and the resulting title (or titles) 65b is displayed for the user to select or reset for a new search. Upon readout at the photofinisher, the code is looked up on a table of titles maintained at the photofinisher's computer and the title corresponding to that code is printed on the back of the print. The search sequence resulting in the ultimately selected title is shown in FIG. 6.

Figure 4:
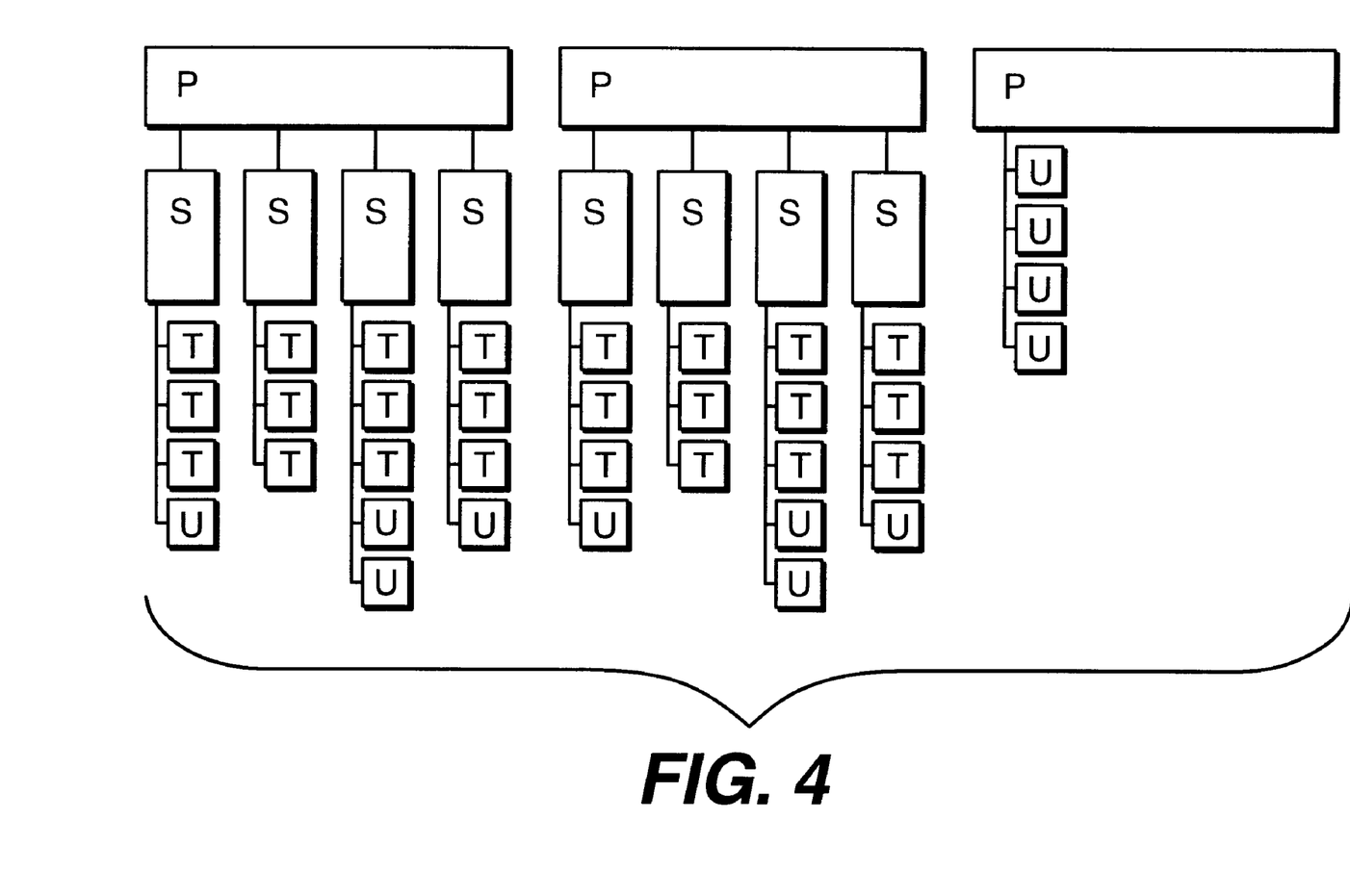
FIG. 4 is a diagram graphically illustrating a hierarchical structure of the coded annotation lists in accordance with an aspect of the invention.
Figure 5:
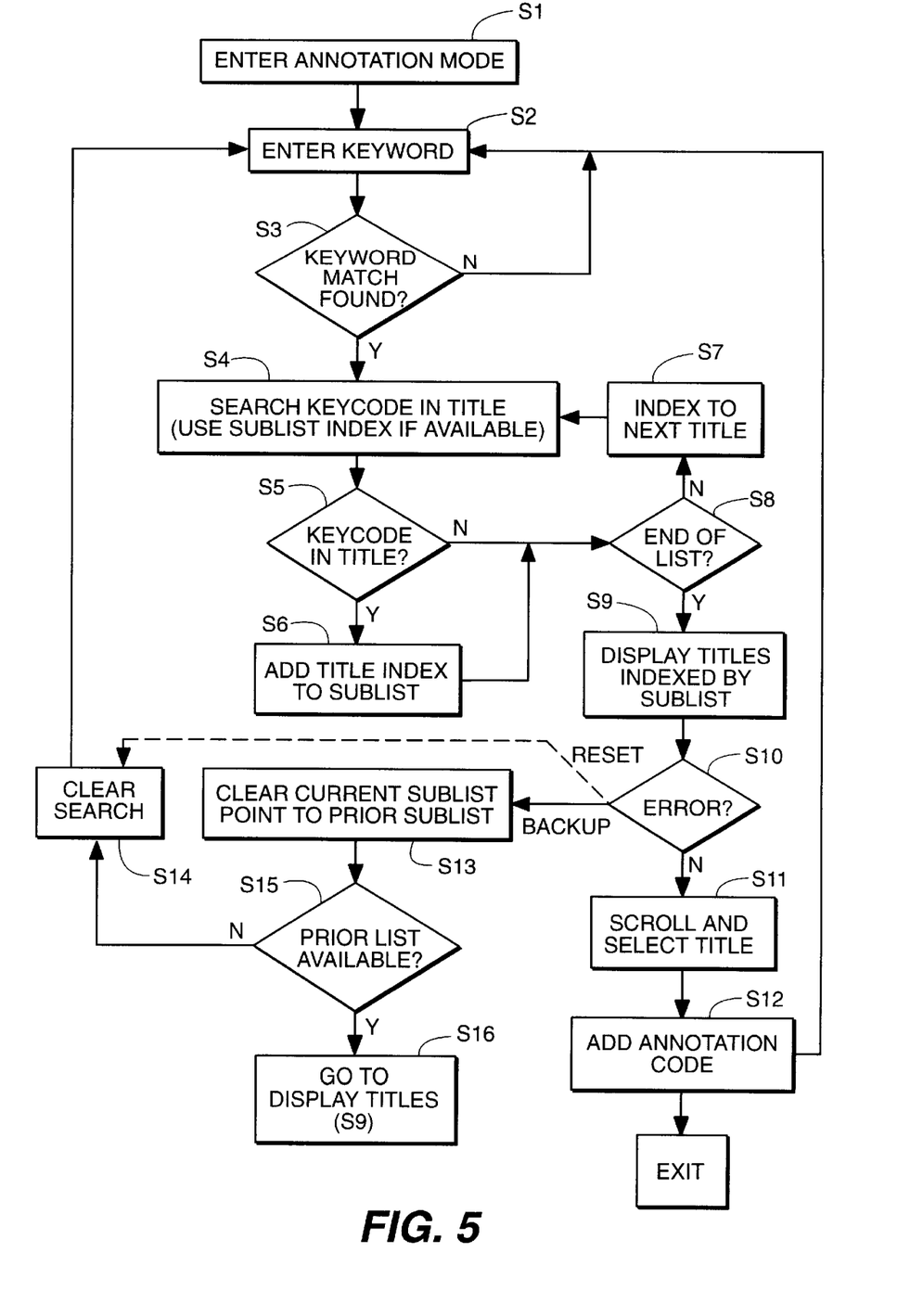
FIG. 5 is a program flow diagram for operation of the camera functional components of FIG. 2.

In a refinement of the invention, the user interfaces with the search engine in microprocessor 30 through the redefinable softkey buttons 20. As shown in table 62 of FIG. 3, each of the group codes associated with a keyword also contains a keyword classification code, such as a primary P, secondary S, tertiary T, and so on down to classification U representing keywords or phrases that uniquely define a title. The hierarchical classification structure is shown in FIG. 4.

When the user enters annotation mode, the display shows the primary subject categories, rather than the titles themselves. The user presses an appropriate one of buttons 20 corresponding to a category, and the indexes of titles in that category are put into the sublist. The user can choose to view the titles of the sublist, or select a secondary category of the remaining titles to further refine the list using the buttons 20. This process continues until the user has selected the desired title.

In another embodiment of the invention, the user speaks or writes the "A" letter, and an alphabetized list of titles starting with the corresponding letter is displayed. The employment of letter recognition also allows the implementation of hybrid annotation, with a combination of canned and spelled letters. As an example, the title associated with a code may be "Happy Birthday _____" and the user spells the name of the person. At the photofinisher, both the title code and customization (i.e. spelled name) are read and printed onto the final print. It will be appreciated that the custom spelling can also be used alone as well.

It should be noted that, while there are many configurations of memory storage for the title codes and recognition data, it is a preferred embodiment of this invention to have the data on removable memory cards that have a common title theme, such as sports or travel. This allows the user to have a large number of titles without requiring huge recognition memories internal to the camera.

This invention allows the user to choose a desired annotation in a minimum number of steps, while still allowing a large number of annotations and minimizing the amount of storage required on the film. The use of handwriting and voice recognition technologies enables random access of the titles, and allows for a more natural user interface.

The invention has been described in detail with particular reference to certain preferred embodiments thereof, but it will be understood that variations and modifications can be effected within the spirit and scope of the invention.

PARTS LIST

10 camera
11 shutter release button
12 viewfinder
14 display panel
16 microphone
18 pressure sensitive panel
18*a* stylus
20 selection buttons
22 removable memory card
30 microprocessor
32 film advance motor
34 shutter control unit
36 exposure control unit
38 zoom motor
40 magnetic recording unit
42 sublist scratch memory
44 microphone/digitizer unit
46 recognition data memory
48 annotation title memory
50 keyword list memory
60 title table
62 keyword table
64*a*,64*b* title sublist
65*a*,65*b* list of displayed titles

What is claimed is:

1. Camera apparatus with provision for selection of image annotations comprising:

data input means for inputting user-initiated keywords associated with one or more potential annotations to be coupled with an image captured on film in the camera, wherein the data input means inputs the user-initiated keywords as at least one of handwritten letters, handwritten words, spoken letters, spoken words and input characters;

a data display device;

a first memory having stored therein a list of said potential annotations suitable for annotation of an image captured on film in the camera, each stored potential annotation having an annotation identification code and one or more group codes stored therewith wherein each group code is associated with a plurality of annotations having a common theme;

a second memory having stored therein a list of keywords, each keyword having one or more of said group codes stored therewith which associate said keyword to related annotation groupings;

a temporary data storage memory;

a microcontroller, responsive the user-initialed keywords input by the data input means, for generating and storing in said temporary data storage memory a sublist of annotation identification codes by matching annotation group codes in the first memory with group codes of those keywords in the second memory which correspond to the user-initiated keywords input by the data input means, and for causing display on the data display device of the annotations corresponding to the sublist of annotation identification codes to allow selection of a desired annotation by the user; and data recording means for recording on photographic film in the camera the annotation identification code corresponding to the annotation selected by said user from said displayed annotations.

2. Camera apparatus according to claim 1 wherein said input means comprises a pressure sensitive panel.

3. Camera apparatus according to claim 1 wherein said input means comprises a pressure sensitive panel and a stylus for inputting characters representing said keywords.

4. Camera apparatus according to claim 1 wherein said input means comprises a voice recognition system accepting keywords spoken by the camera user.

5. Camera apparatus according to claim 1 wherein said keyword group codes include a classification code ranking each keyword into a hierarchical structure of related subject matter.

6. A method of selecting image annotations in a camera by a camera user, the image annotations intended to be associated with image frames exposed onto film in the camera, the method comprising:

storing a list of potential annotations in memory from which said image annotations are to selected, each of said potential annotations having an annotation identification code and one or more group codes stored therewith wherein each group code is associated with a plurality of annotations having a common theme;

inputting with a data input means by said user to said camera microcontroller user-initiated initiated keywords associated with said potential annotations to be coupled with an image captured on film in the camera, wherein the data input means inputs the user-initiated keywords as at least one of handwritten letters, handwritten words spoken letters, words words and input characters;

utilizing group codes associated with each input keyword to search from said list of potential annotations those annotations having group codes matching those of the keywords and creating a sublist of annotation identification codes according to said search results; and displaying said sublist of annotations to enable selection by said user of a desired annotation.

7. The method of claim 6 wherein said user-initiated keywords are inputted via a voice recognition system.

8. The method of claim 6 wherein said user-initiated keywords are inputted via a handwriting recognition system.

9. The method of claim 8 wherein keywords are inputted via a stylus actuated pressure sensitive pad included as part of the handwriting recognition system.

10. The method of claim 6 wherein keywords are stored in a keyword memory with associated group codes which include classification codes ranking each keyword into a hierarchical structure of related structure.

* * * * *